M. R. HUTCHISON.
SIGNALING HORN.
APPLICATION FILED MAY 15, 1912.
1,172,713.
Patented Feb. 22, 1916.
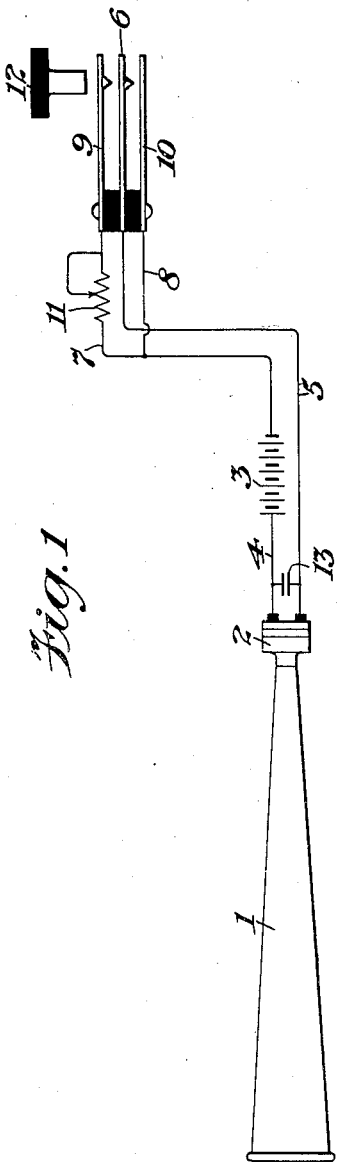
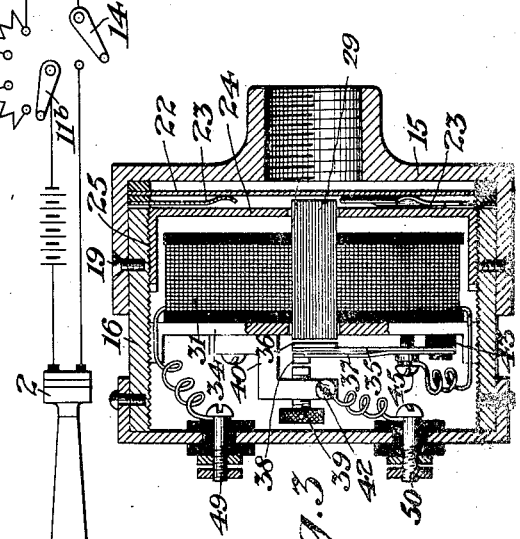
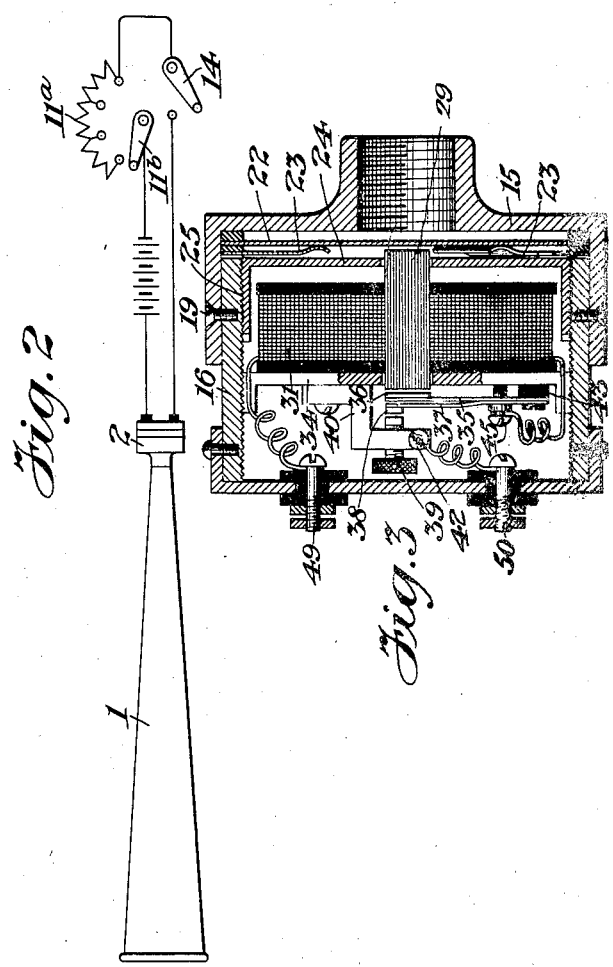
WITNESSES
Miller Reese Hutchison INVENTOR
BY
G. C. Dean ATTORNEY

UNITED STATES PATENT OFFICE.

MILLER REESE HUTCHISON, OF ORANGE, NEW JERSEY, ASSIGNOR TO LOVELL-McCONNELL MANUFACTURING COMPANY, A CORPORATION OF DELAWARE.

SIGNALING-HORN.

1,172,713.  Specification of Letters Patent.  Patented Feb. 22, 1916.

Application filed May 15, 1912. Serial No. 697,449.

*To all whom it may concern:*

Be it known that I, MILLER REESE HUTCHISON, a citizen of the United States, and resident of Orange, in the county of Essex and State of New Jersey, have invented certain new and useful Improvements in Signaling-Horns, of which the following is a specification.

The invention herein set forth relates to and concerns alarm or signaling horns, particularly those intended for use on automobiles or other vehicles and in which the sound is produced by a member caused to vibrate at high speed. I have invented and disclosed various arrangements and devices for producing extremely loud and penetrating alarm or signaling notes such devices being disclosed for instance in my prior application Serial No. 278,562, now Patent 1,111,463, granted September 22, 1914, and my prior Patent 956,898 granted May 3rd, 1910. In the general type of signal to which my invention relates I have succeeded in specializing the structure in this direction, to such an extent that the maximum volume of sound issuing from the horn, when excited by the diaphragm, is great enough to serve the purposes of a most efficient alarm, on high speed automobiles, proceeding at extremely high speeds. I find, however, that apparatus designed and adjusted to serve such high speed purposes on the road, through thinly settled districts, becomes highly objectionable in towns and cities where a long distance warning is totally unnecessary. While such apparatus may properly be employed on fire engines, ambulance and other "hurry up" vehicles which have by law or ordinance right of way to proceed at high speed, such loud signals are nevertheless unreasonable on private vehicles and their use frequently amounts to a public nuisance, which there is, even at the present time, a tendency to suppress by city and town ordinance. To meet these conditions, I have invented a variety of forms of the devices and arrangements of apparatus whereby the extremely loud, penetrating signals, or modified, softened pleasing signals, may be produced at will, thereby making it possible for the operator to have the most efficient long distance signal for use in the country, when proceeding at high speeds, and the softer signals in town, or when proceeding at low speeds. At the same time, the arrangement may be such that the louder signal, will be instantly available, even in town, for use, should any great emergency arise to justify its employment. Various ways of accomplishing these results are disclosed in my prior application Serial No. 291,518 filed December 13th, 1905, now Patent 1,043,703, granted November 5, 1912. The invention herein set forth includes certain subject-matter disclosed in said prior application and relates to and concerns alarms or signals in which there is a vibrating member and an agitating device constructed and arranged to operate on a plurality of different current strengths so as to produce signal vibrations of greater or less amplitude and strength. I accomplish the desired result by cutting down the power from the battery or cutting down the efficiency of the battery circuit and I apply the two strength effect in exciting a single vibrator. Preferably I employ a single circuit in which resistance may be placed at will so that a weaker or stronger current may be delivered to the device which actuates the vibrating member. The resistance may be in the form of a rheostat within easy reach of the operator or it may be a permanent resistance positioned somewhere about the car and arranged in a branch circuit which may be thrown in at will. To produce the separate and distinct tones I preferably have the controlling member or switch so constructed that by moving it to one position the lower note is sounded and by moving it to second position the higher note is sounded. The controlling member or switch may be such that the natural tendency of the operator when excited or in a dangerous position will be to move the controlling member to its limiting extent and thus sound the higher or louder tone. Two of the practical ways of accomplishing this will be more fully understood by a detailed description in connection with the accompanying drawings in which:

Figure 1 is a diagrammatic representation of a horn and a circuit including a resistance and a three point switch, Fig. 2 is a diagrammatic representation of a circuit with a rheostat and Fig. 3 is a longitudinal section through a part of the horn showing one form of sound producing device which may be employed.

In the arrangement shown in Figs. 1 and 2 of these drawings a loud racing horn 1 of a type adapted to be attached to a touring automobile is employed. The horn is provided with a vibrator 2 which may be of the type disclosed in my prior application Serial No. 278,562, now Patent 1,111,463, granted September 22, 1914, or my prior Patent 956,898 but in this application I do not claim any improvement in the vibrator *per se* and it is evident that any suitable form of vibrator may be employed which is capable of operating to produce different sounds upon different current strengths. In the arrangement shown in Fig. 1, a battery 3 is connected to one terminal of the horn vibrator by a conductor 4 and the other terminal is connected by conductor 5 with the middle contact 6 of a three leaf switch. The other pole of the battery 3 is connected by parallel branches 7 and 8 to the other two members 9 and 10 of the switch. In one of these branches 7 is a suitable resistance 11. A push button 12 is arranged to force the leaf 9 against the leaf 6 thereby closing the circuit through the battery vibrator and resistance 11. A further movement of the push button 12 forces 6 against 10 thereby closing a low resistance circuit through the branch 8 and shunting or short-circuiting the resistance 11. With such an arrangement the resistance 11 may be adjusted to such value as will permit a current flow just large enough to produce a modified small volume of sound from the horn 1 by a comparatively feeble actuation of the diaphragm of the vibrator 2. For an emergency or high speed use, however, the operator has only to press the button 12 a little harder thereby short circuiting the resistance 11 and throwing the full battery strength on the vibrator thus producing the loudest possible signal. The battery 3 may be a special one or may be the storage battery commonly employed for sparking. With this circuit, both the diaphragm agitator and its interrupter may be within the case of a horn, but the interrupter may be a separate device having a separate interrupting electromagnet. In every case a condenser 13 may be bridged across the vibrating make and break and may be adjusted to the electrical constants of the coil, circuit, etc., in accordance with principles and practices well known in the art.

In Fig. 2 I have diagrammatically indicated an arrangement similar to that shown in Fig. 1. There is a loud sounding horn 1 and a series circuit from a battery 3 through a circuit closer 14 and rheostat 11ᵃ. The rheostat may be set for any desired strength of current and resulting signal. The production of the signal may be determined by the circuit closer 14 and in such case the rheostat may be located out of the way near the battery and the switch 14 near the operator. If desired the entire control of the circuit may be by the rheostat 11ᵃ alone which in such case will be placed near the operator. When the controller 11ᵇ is turned it will produce first a very soft note and as resistance is cut out the note will increase in loudness to a maximum and generally will increase in pitch as well as loudness.

Merely as an example of vibrator I have illustrated in Fig. 3 substantially the one disclosed in my prior application 278,562 filed September 15th, 1905, now Patent 1,111,463, granted September 22, 1914. This includes a front cap 15 the inner wall of which is preferably plane faced and back of the same substantially parallel therewith and spaced away a short distance is a diaphragm 22. On the back side of said diaphragm may be a three point contact buckling spring 23 and behind this is adjustably mounted a resonating wall or partition 24 carried by a cylindrical flange 25 exteriorly screw threaded to fit the cylinder 16. The annular 3-point buckling springs 23, the diaphragm 22 and the cap 14 may be spaced apart by suitable washers and held by the screws 19.

The motor, or diaphragm vibrating device, comprises a longitudinally sub-divided or laminated, iron core 29, adapted to project through an opening, in the resonator partition 24, and surrounding said core is the coil or winding 31, mounted upon a transverse segmental screw threaded bridge 34. Carried by this bridge is the vibrating circuit closing and circuit breaking device, for interrupting the current and causing pulsations in the coil of the electromagnet. It comprises a compound vibrating member, consisting of a main leaf spring 35, carrying an armature 36 of magnetic material, and a secondary spring 37, carrying a sparking contact 38. The latter contact may be of platinum, or platinum-iridium, and is adapted to contact with and close the circuit through a contact of similar material on screw 39, carried by the standard 40, which, like the other parts mentioned, is secured to the bridge piece 34. The free end of 40 is split to the screw 39 and is provided with a transverse pinching screw 42, for locking screw 39 in position. The vibrator is mounted upon an insulating block 43. A screw 45, tipped with or contacting with an insulating block, serves to adjust the normal position of the free end of the vibrator when at rest. The frequency of the vibrator may be changed greatly by adjusting this screw 45, whereas finer adjustments of frequency, etc., may be made by adjusting the contact screw 39.

The vibrator is secured directly to the horn and the lead and return wires are attached to the posts 49 and 50, by binding nuts which are properly insulated from the case. The wires are then run serially through the battery and circuit controllers as shown in Figs. 1 and 2.

I claim:—

1. In a signaling device, the combination of an amplifying horn, a diaphragm associated therewith, means adapted to cause said diaphragm to vibrate to sound a signal, a device associated with said means adapted to alter the action of said means upon said diaphragm whereby the same may be actuated to sound a second and different signal, and means common to said first named means and said device for controlling said first named means and said device.

2. In a signaling device, the combination of an amplifying horn, a diaphragm associated therewith, electrically controlled means adapted to cause said diaphragm to vibrate to sound a signal, means to alter the action of said electrically controlled means upon said diaphragm whereby the same may be vibrated to sound a second and different signal, and means common to said electrically controlled means and said modifying means for controlling said electrically controlled means and said modifying means.

3. In a signaling device, the combination of an amplifying horn, a diaphragm associated therewith, an electromagnet adapted to cause said diaphragm to sound a signal, a circuit containing a source of current over which said magnet is energized, a vibratory make-and-break in said circuit, means in said circuit for changing the strength of current from said source, whereby the action of said magnet on said diaphragm is altered, so that the same produces a second and different signal, and a circuit controller common to said electromagnet and said means for closing a circuit through said magnet and said means and for eliminating said means from said circuit.

4. In a signaling device, the combination of a diaphragm, an electromagnet and a circuit making and breaking device adapted to act upon said diaphragm to cause the same to sound a signal, a source of current, a circuit, including said magnet and said source, a multi-position switch in said circuit, a current modifying device adapted to be connected in said circuit when said switch is in one of said positions and to be eliminated therefrom when said switch is in another of said positions whereby said magnet is energized by currents of different strength and said diaphragm is caused to sound different signals.

5. In a signaling device of the class described the combination of a diaphragm, an electromagnet and a circuit making and breaking device adapted to cause said diaphragm to sound signals, a source of current, a circuit in which said source and magnet are connected, a three position switch associated with said circuit, a current modifying device, said switch having a normal or open position in which said circuit is interrupted, a second position in which said current modifying device is included in said circuit and said magnet is energized by a relatively weak current to cause said diaphragm to sound a soft signal and a third position in which said device is eliminated from said circuit and said magnet energized by a relatively strong current to cause said diaphragm to sound a loud signal.

6. In a signaling device of the class described, the combination of a means adapted to produce a signal when actuated, electrically controlled means for actuating said first named means, a circuit over which said electrically controlled means is governed, a source of current in said circuit, a switch adapted to open and close said circuit, and having three superposed contacts, a resistance device connected between the two lower contacts, and adapted to be included in said circuit when the upper contact is depressed into engagement with the middle contact and to be excluded therefrom when the middle contact is in engagement with the lower contact.

7. In a signaling device of the class described, the combination of a vibratile member adapted when vibrated to sound signals, electromagnetic means adapted when actuated to vibrate said member, a source of current to effectively actuate said means, circuit conductors associating said source and said means, a device for modifying the effects of said source upon said means, a circuit controller in said circuit for connecting said device and for eliminating said device from said circuit, said circuit being open and said means unactuated when said circuit controller is in normal condition.

8. In a signaling device, the combination of signal producing means, electromagnetic means for actuating said signal producing means, a source of current, a circuit associating said source with said electromagnetic means, a current modifying device associated with said circuit, and a circuit controller normally interrupting said circuit, for connecting said current modifying device in circuit with said magnet and for shunting said current modifying device from said circuit.

9. In a signaling device of the class described, the combination of a vibratile diaphragm adapted when vibrated to produce signals, electromagnetic means for vibrating said diaphragm and causing said diaphragm to produce signals of different characters, a source of energy for driving said electromagnetic means, circuit connections associating said source and said means, a resistance device associated with said circuit connections and a circuit controller opening said circuit when in normal position and adapted when operated to a second position to connect said resistance device in said circuit connections and when operated to a third position to eliminate said resistance device from said circuit connections.

Signed at W. Orange in the county of Essex, and State of New Jersey, this ninth day of May, 1912.

MILLER REESE HUTCHISON.

Witnesses:
A. B. MASTERLIN,
PAUL SUTCLIFFE.